Nov. 17, 1959 — F. M. COTTLE — 2,913,243
MODEL AIRCRAFT CONTROL
Filed Feb. 7, 1957 — 2 Sheets-Sheet 1
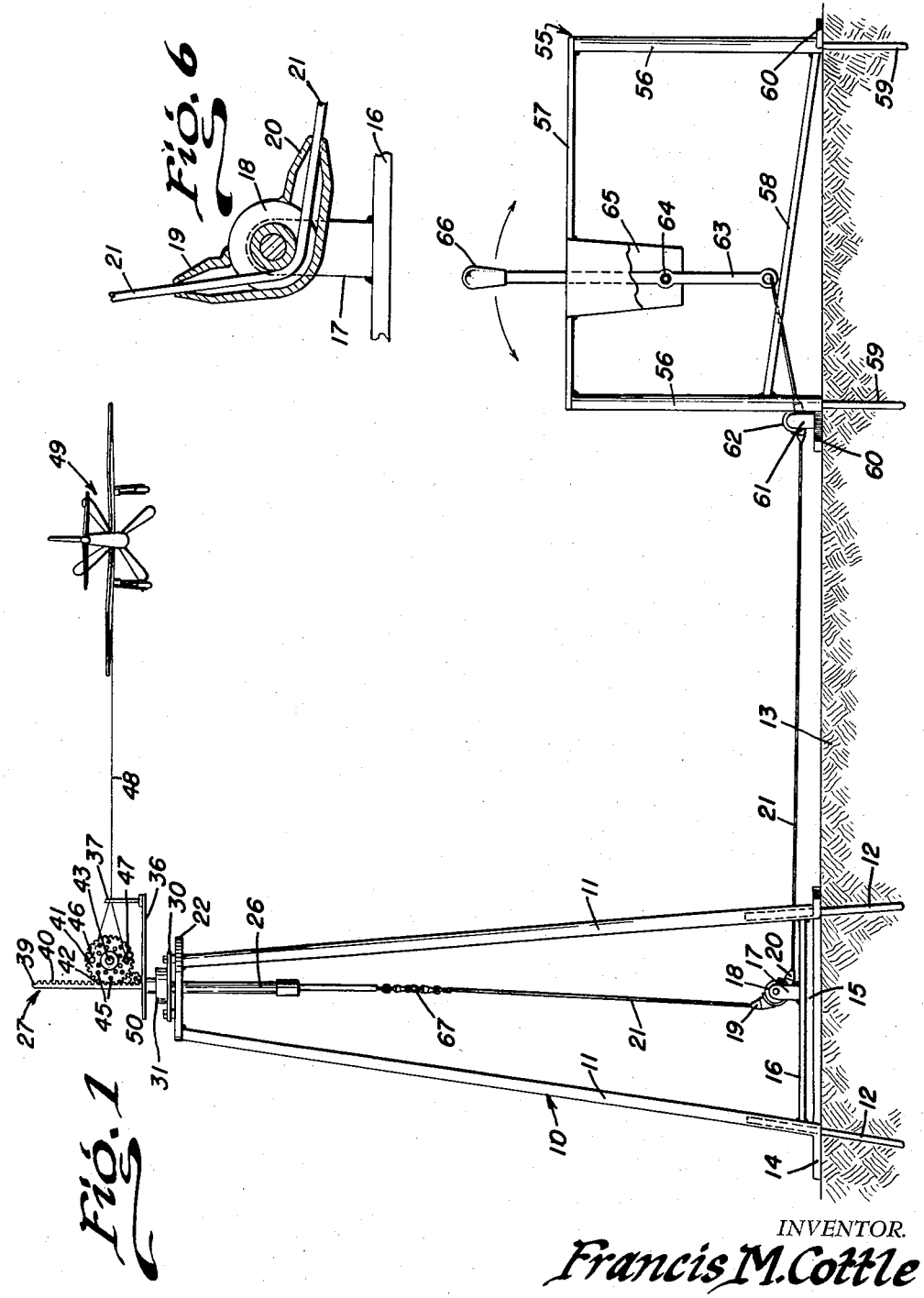
INVENTOR.
*Francis M. Cottle*
BY
*Sherman Levy* ATTORNEY

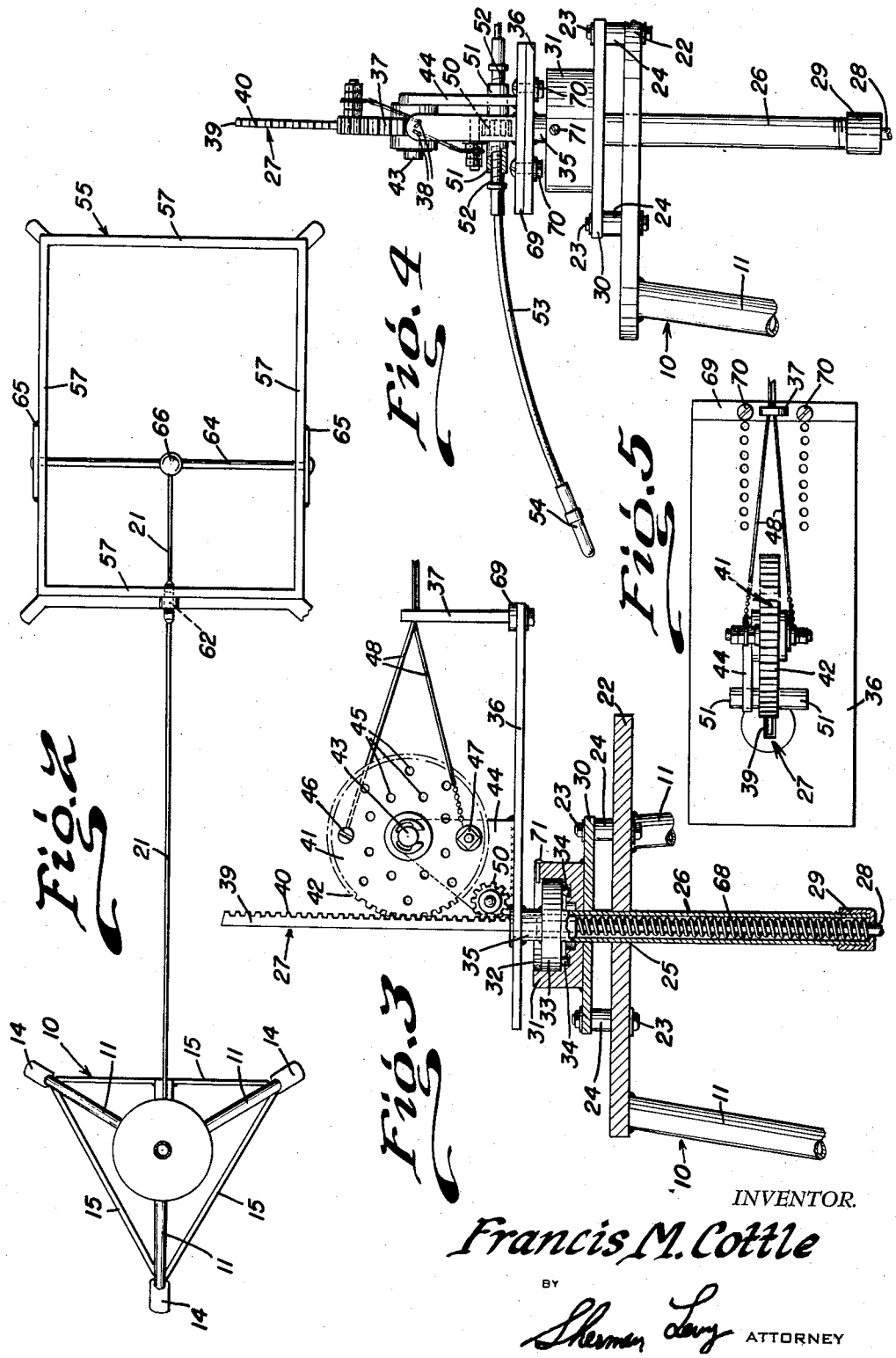

United States Patent Office 2,913,243
Patented Nov. 17, 1959

2,913,243

MODEL AIRCRAFT CONTROL

Francis Marion Cottle, Fresno, Calif., assignor of one-half to Leon Boro, Fresno, Calif.

Application February 7, 1957, Serial No. 638,827

5 Claims. (Cl. 272—31)

This invention relates to model aircraft, and more particularly to a control mechanism for model aircraft.

The object of the invention is to provide a mechanism which will permit a model aircraft to be readily controlled from a remote location.

Another object of the invention is to provide a model aircraft control mechanism which includes a manually operable means for controlling a model aircraft wherein the model aircraft is self-propelled so that the model aircraft is under the accurate control of the user or operator.

Another object of the invention is to provide a model aircraft control mechanism which includes a stand that is adapted to have the model aircraft move continuously therearound, there being a manually operable means which is remote from the stand so that by properly manipulating the manual means, the aircraft can be made to perform or operate as desired.

A further object of the invention is to provide a model aircraft control mechanism which is extremely simple and inexpensive to manufacture.

Other objects and advantages will be apparent during the course of the following description.

In the accompanying drawings, forming a part of this application, and in which like numerals are used to designate like parts throughout the same:

Figure 1 is an elevational view illustrating the model aircraft control apparatus of the present invention.

Figure 2 is a top plan view of the apparatus of the present invention, and with parts broken away and in section.

Figure 3 is an enlarged elevational view illustrating certain constructional details of the apparatus, and with parts broken away and in section.

Figure 4 is a view taken at right angles to the view shown in Figure 3.

Figure 5 is a plan view illustrating a portion of the apparatus shown in Figures 3 and 4.

Figure 6 is a fragmentary sectional view taken through the guide pulley assembly.

Referring in detail to the drawings, the numeral 10 indicates a stand which can be made of any suitable material, and the stand 10 includes a plurality of angularly arranged upstanding legs 11. Depending from each of the legs 11 is a prong 12 which may extend into the terrain or ground as indicated by the numeral 13, Figure 1. Flanges 14 extend outwardly from the lower ends of the legs 11, and horizontally disposed braces 15 interconnect the lower portions of the legs 11 together. Extending between the lower portion of the frame and supported thereby is a horizontally disposed arm 16, and extending upwardly from the arm 16 and secured thereto is a bracket 17 which provides a support for a guide pulley 18, Figure 6. Guide members 19 and 20 extend outwardly from the pulley 18, and a cable 21 extends through the guide members 19 and 20 and is arranged in engagement with the guide pulley 18.

Secured to the upper ends of the legs 11 is a horizontally disposed base 22, and extending upwardly from the base 22 is a plurality of securing elements such as bolt and nut assemblies 23. A spacer member 24 is mounted on each bolt 23, and the base 22 is provided with a central opening 25. Extending through the opening 25 is a tube 26, and a vertically shiftable rod 27 has a lower portion 28 projecting down through the tube 26. A collar 29 is arranged in threaded engagement with the lower end of the tube 26, Figure 3.

Extending upwardly from a horizontally disposed plate 30 and secured thereto, is a support member 31, the plate 30 being supported on the spacer members 24. The support member 31 is provided with a central recess 32 in which is positioned a rotary body member 33, and ball bearings 34 are interposed between the body member 33 and the adjacent lower portion of the support member 31. Extending upwardly from the body member 33 is a neck 35 which is secured to a rotary platform 36, and the platform 36 is horizontally disposed. Projecting upwardly from an end of the platform 36 and secured thereto, is a guide piece 37 which is provided with a pair of openings 38 adjacent its upper end, Figure 4.

The rod 27 further includes an upper portion 39 which has a plurality of teeth 40 thereon, and the teeth 40 mesh with teeth 42 of a rotary gear wheel 41. The gear wheel 41 is journaled on an ear or flange 44 by means of a shaft or pin 43, and the ear 44 is secured to the platform 36 in any suitable manner, as for example by welding. The gear wheel 41 is provided with a plurality of openings 45 whereby suitable securing elements such as the securing elements 46 and 47 can be extended through various of these openings 45. Cables or lines 48 are connected to the securing elements 46 and 47, and these cables 48 project through the openings 38 in the guide piece 37. The cables 48 are connected to the model aircraft 49 in the usual manner.

There is further provided a gear member 50 which is journaled in the ear 44, and the gear 50 has its teeth meshing with the teeth 40 of the rod 27. Extending outwardly from opposite sides of the gear 50 is a pair of connectors 51, and a bushing 52 is adapted to be threadedly connected to the connectors 51. A cable 53 extends from the bushing 52, and a knob 54 is connected to the outer end of the cable 53, Figure 4.

There is further provided a manually operable means for controlling the model aircraft 49, and this means comprises a frame which is spaced from the stand, the frame being indicated generally by the numeral 55, Figure 1. The frame 55 includes a plurality of upstanding posts or legs 56 which have prongs 59 depending therefrom for insertion or projection into the ground 13. The frame 55 further includes crosspieces 57 and braces 58, and flanges 60 extend outwardly from the lower ends of the legs 56. A bracket 61 is supported by the frame 55 and the bracket 61 supports a guide pulley 62 which has the cable 21 arranged in engagement therewith. The end of the cable 21 is connected to the lower end of a movable stick or handle 63, and the stick 63 is journaled on a pivot rod or shaft 64 which extends between a pair of vertically disposed wall members 65, the wall members 65 being secured to the frame 55. A hand grip 66 is arranged on the upper end of the stick 63 for facilitating the manual manipulation thereof.

From the foregoing, it is apparent that there has been provided a mechanism which is especially suitable for use in controlling the flight of model aircraft from a remote locality. In use, the parts can be hooked up or arranged as shown in the drawings, and it will be seen that the frame 55 is spaced from the stand 10. When the apparatus is being used outdoors, the prongs such as the prongs 12 and 59 can extend down into the ground 13 so as to securely anchor the apparatus. Then, with the cables 48 connected to the model aircraft 49, the user or operator can grip the knob 66 so that the stick or handle 63 can be pivoted on the rod 64. The rod 64 is journaled between the wall members 65, and the wall members 65 are secured to the frame 55 in any suitable manner, as for example by welding. Thus, by moving the stick 63 by means of the hand grip 66, the cable 21 can be moved and this movement of the cable 21 will result in vertical shifting of the rod 27, since the lower end of the rod 27 is connected to the cable 21 through the medium of a swivel connection 67, Figure 1. The cable 21 is arranged in engagement with the guide pulleys 18 and 62 and as the stick 63 is shifted manually in the direction shown by the arrows in Figure 1, the rod 27 will be shifted in the tube 26. A coil spring 68 is positioned within the tube 26, and the coil spring 68 is circumposed on the lower portion 28 of the rod 27. As the rod 27 is shifted, the gear wheel 41 will be rotated since the teeth 40 of the rod 27 mesh with the teeth 42 of the gear wheel 41. This rotation of the gear wheel 41 about the pin 43 will cause the pair of cables 48 to be moved since the cables 48 are connected to the gear wheel 41 through the medium of the screws or bolts 46 and 47. The other ends of the cables 48 are connected to the model aircraft 49 so that the usual controls on the model aircraft will be moved as the cables 48 are moved whereby the aircraft 49 can be caused to travel in a predetermined or desired path or direction. The cables 48 extend through the openings 38 in the upper end of the guide piece 37. As the aircraft 49 travels around in a circular path, the platform 36 rotates and similarly the body member 33 rotates, and due to the provision of the ball bearings 34 which engage the stationary support member 31, there will be a minimum of frictional contact between the various parts. The stick 63 can be moved to different positions so as to shift the rod 27 to the desired position whereby the amount of rotation of the gear wheel 41 can be varied so as to accurately control the cables 48 which are connected to the aircraft 49. The guide piece 37 includes a lower flange 69 which is secured to the platform 36 through the medium of securing elements 70. Set screws 71 extend inwardly through the upper portion of the support member 31 for maintaining the body member 33 in the recess 32 in the support member 31.

The pair of lines or cables 48 which control the plane 49 are adapted to be attached to the left wing tip of the plane, but the exact point of connection with the plane will of course vary with the particular plane being used. Thus, sometimes the control wires 48 may be under the wing and sometimes they may come through the wing but the control lines 48 attach to the left wing tip.

The gear 50 and the line 53 are adapted to provide a control line which is adapted to be used as a mono-line control system or a single line control system, and this type of control line attaches to the device by a line leading from the airplane to the flexible wire rod 53 as shown in Figure 4. Due to the provision of the pair of connectors 51, a flexible rod such as the rod 53 can be attached to either side and this is necessary so as to insure that the mono-line plane controls can travel in either direction. Thus, the flexible rod 53 can travel in both a clockwise as well as a counterclockwise position so that the mono-line plane can be controlled in either direction.

Due to the provision of the plurality of openings 45 in the gear wheel 41, the position of the bolts 46 and 47 can be readily changed or adjusted as desired whereby this adjustment can be made without the necessity of changing the teeth on the gear. The guide piece 37 is provided with a pair of eyes or openings 38 through which the lines 48 extend.

The aircraft is constructed so that it can be readily assembled or disassembled, and the device is ruggedly constructed so that it will not readily get out of order.

The parts can be made of any suitable material and in any desired shape or size. The parts are constructed so that when the control stick 63 is pushed forward, the model airplane controls are placed in a dive position. Similarly, when the control stick is pulled back, the model airplane controls are placed in a rise position. Furthermore, the control stick 63 can be arranged in a neutral or level flight position. The various legs for the stand and frame can be made of any suitable material such as tubular pipe which are provided with prongs or spikes so that the devices can be easily secured in soft terrain. The standard or stand 10 may be constructed so that the airplane can be flown in level flight at an altitude of four feet which is the official altitude adopted by various model plane associations. By means of the bolts 23, the plate 30 can be leveled, and the control wires 48 are attached to the gear 41 in such a manner that binding is prevented whereby the parts will rotate without twisting. The platform 36 rotates as the aircraft turns or moves. As the rod 27 is moved by means of the stick 63, the gear 50 will also move and this will cause rotation of the extension wire 53 whereby a monoline type of model plane can be readily controlled, it being understood that a mono-line model plane being a plane with only one control wire. Thus, it will be seen that the apparatus of the present invention can be used to fly either a two line model plane or a mono-line model plane.

The spring 68 serves as a two way expansion and compression spring, and this spring serves to keep the rack in a raised or dive position. When the control stick is pulled back, this spring is compressed, which places the plane in the climbing position. When the control stick is moved forward from the climb position, this spring pulls the rack down thereby recovering to either the level flight or dive position. The cable 53 serves to make a flexible connection for the control or ground end of the monoline control wire. When the rack moves from either the lowest to the highest position, or from the highest to the lowest position, the cable 53 makes approximately one and a half turns in a clockwise direction, or in a counterclockwise direction. When this flexible shaft or cable is connected to the monoline control wire, it likewise turns the control wire in either a clockwise or counterclockwise direction, to thereby place the monoline control model airplane in either a climb, level flight, dive or any intermediate position. The apparatus is constructed so that it will fly both a monoline control model and the models that are controlled by two lines.

The flanges 14 and 60, in addition to the previously described functions, serve as a means for depressing the legs of the stands into the turf and also serve as a method of self-levelling each stand since these flanges can be stepped on so that the weight of the person's body will cause the members to move downwardly.

The elements 51, 52, 53 and 54 shown in Figure 4 of the drawing, are for the purpose of controlling a monoline model aircraft. A monoline aircraft is a model which is controlled by one piece of wire as contra-distinguished from a model aircraft that is controlled by two wires. The two wire model is controlled by holding a U in the hand to the ends of which one strand of wire is attached that leads to the plane. The advantage of the monoline is that there is less drag where you have only one wire leading from the control device to the plane, and this permits greater speed among other advantages.

I claim:

1. In a control mechanism, a stand including a plurality of angularly arranged legs, a horizontally disposed base secured to the upper ends of said legs, a horizontally disposed plate supported above said base, a support member extending upwardly from said plate and secured thereto, a body member rotatably arranged in said support member, a vertically disposed tube extending through said support member, plate and base, a vertically shiftable rod extending through said tube and including an upper portion having teeth thereon and said rod further including a lower portion, a coil spring circumposed on the lower portion of said rod and positioned within said tube, a rotary platform arranged above said support member, an ear extending upwardly from said platform and secured thereto, a gear wheel rotatably connected to said ear and having teeth meshing with the teeth on the upper portion of said rod, a guide piece extending upwardly from said platform and provided with a pair of openings therein adjacent the upper end thereof, a pair of control lines extending through said last named openings and each having an end connected to said gear wheel while the other end of each of the control lines is connected to a movable model.

2. The structure as defined in claim 1, and further including manually operable means for moving said rod to thereby rotate said gear wheel.

3. In a control mechanism, a stand including a plurality of angularly arranged legs, a horizontally disposed base secured to the upper ends of said legs, a horizontally disposed plate supported above said base, a support member extending upwardly from said plate and secured thereto, a body member rotatably arranged in said support member, a vertically disposed tube extending through said support member, plate and base, a vertically shiftable rod extending through said tube and including an upper portion having teeth thereon and said rod further including a lower portion, a coil spring circumposed on the lower portion of said rod and positioned within said tube, a rotary platform arranged above said support member, an ear extending upwardly from said platform and secured thereto, a gear wheel rotatably connected to said ear and having teeth meshing with the teeth on the upper portion of said rod, a guide piece extending upwardly from said platform and provided with a pair of openings therein adjacent the upper end thereof, a pair of control lines extending through said last named openings and each having an end connected to said gear wheel while the other end of each of the control lines is connected to a movable model, manually operable means for moving said rod to thereby rotate said gear wheel, said manually operable means comprising a frame spaced from said stand and including a plurality of spaced apart legs, a control stick rockably supported by said frame, guide pulleys supported on said frame and stand, and a cable engaging said pulleys and having one end connected to said stick and its other end connected to said rod.

4. In a control mechanism, a stand, a horizontally disposed base secured to the upper end of said stand, a horizontally disposed plate arranged above said base, a support member extending upwardly from said plate and secured thereto, a body member rotatably arranged in said support member, a vertically disposed tube extending through said support member, plate and base, a vertically shiftable rod extending through said tube and including an upper portion having teeth thereon and said rod further including a lower portion, resilient means circumposed on the lower portion of said rod and positioned within said tube, a rotary platform arranged above said support member, an ear extending upwardly from said platform and secured thereto, a gear wheel rotatably connected to said ear and having teeth meshing with the teeth on the upper portion of said rod, a guide piece extending upwardly from said platform and provided with a plurality of openings therein, control lines extending through said last named openings and each having an end connected to said gear wheel while the other end of each of the control lines are adapted to be connected to a movable model, manually operable means for moving said rod to thereby rotate said gear wheel, said manually operable means comprising a frame spaced from said stand, a control stick rockably supported by said frame, guide pulleys supported by said frame and stand, a cable engaging said pulleys and having one end connected to said stick and its other end connected to said rod, and prongs depending from said stand and frame.

5. In a control mechanism, a stand, a base secured to the upper end of said stand, a plate supported above said base, a support member extending upwardly from said plate and secured thereto, a body member rotatably arranged in said support member, a tube extending through said support member, plate and base, a vertically shiftable rod extending through said tube and including an upper portion having teeth thereon and said rod further including a lower portion, resilient means circumposed on the lower portion of said rod and positioned within said tube, a rotary platform arranged above said support member, an ear extending upwardly from said platform and secured thereto, a gear wheel rotatably connected to said ear and having teeth meshing with the teeth on the upper portion of said rod, a guide piece extending from said platform and provided with openings therein, control lines extending through said last named openings and each having an end connected to said gear wheel while the other end of each of the control lines is connected to a movable model.

References Cited in the file of this patent

UNITED STATES PATENTS

| | | |
|---|---|---|
| 2,300,649 | Christiansen | Nov. 3, 1942 |
| 2,313,554 | Jones | Mar. 9, 1943 |
| 2,390,307 | Kelecius | Dec. 4, 1945 |
| 2,692,775 | Marsh | Oct. 26, 1954 |
| 2,775,453 | Biller | Dec. 25, 1956 |
| 2,836,989 | Schultz | June 3, 1958 |